Aug. 28, 1951     F. E. TUTTLE     2,566,265
METHOD OF MAKING FINE LINE SCREENS
Filed Nov. 30, 1949

FORDYCE E. TUTTLE
INVENTOR

BY
ATTORNEYS

Patented Aug. 28, 1951

2,566,265

UNITED STATES PATENT OFFICE 2,566,265

METHOD OF MAKING FINE LINE SCREENS

Fordyce E. Tuttle, Rochester, N. Y., assignor to Eastman Kodak Company, Rochester, N. Y., a corporation of New Jersey Application November 30, 1949, Serial No. 130,156

6 Claims. (Cl. 250—62)

The present invention relates to photography and particularly to an improved method of making fine line screens, or grids, used in producing and/or viewing composite pictures used to obtain changeable picture effects and/or motion illusion effects.

Apparatus and techniques are shown in the prior art whereby an animate object may be photographed in slightly changed positions; the various exposures being combined in a single print so that when the print is moved relative to a line screen, or grid, identical to one through which the exposures are originally made, the effect of a moving animate object will be obtained. The same apparatus and techniques can be used to produce exposures of different still subjects on the same print, so that by movement of the line screen, or grid, relative thereto, a series of different still subjects will be brought successively into view.

In U. S. patent application Serial No. 114,352, filed September 7, 1949, and of which I am a coinventor, there is disclosed the idea of making the transparent lines of these line screens, or grids, very narrow and separating them by opaque lines many times the width of the transparent lines so as to increase the number of different exposures which can be placed on a single print. One example given in this application specifies a line screen in which the transparent lines are .001" wide and separated by opaque lines .029" wide, whereby thirty different pictures can be exposed on a single print before double exposure occurs.

To date, these line screens for exposing and viewing these composite pictures have been produced by ruling through opaque lacquer on glass with a diamond. While it is possible with this technique to obtain a minimum line width of approximately .001", it is not too satisfactory, from a practical standpoint, for several different reasons. For example, it is not only an exacting job to initially sharpen the diamond tool so as to produce a line exactly .001" wide, but the diamond must be resharpened from time to time during the production of even a single screen. This not only involves resharpening of the diamond, but involves a constant check on the lines as they are inscribed, so as to know when the tool has sufficiently worn to require resharpening. Another difficulty of this technique is that it requires a very uniform application of lacquer to the glass plate, so far as thickness is concerned. A further difficulty concerns the physical characteristics of the lacquer and its adherence to the glass in a uniform manner throughout the entire area of the plate which in part determine whether the lacquer can be removed from the plate by the diamond, so as to leave transparent lines having uniform width throughout their length and true edges, rather than ragged edges, due to a tendency for the lacquer being removed to pull neighboring portions of lacquer with it.

From experimental results thus far observed, it is apparent that, for certain types of work, line screens or grids with finer transparent lines, i. e., in the order of .0005" would be desirable. In view of the practical difficulty encountered in producing grids having transparent lines .001" wide with the known techniques, it is obvious that these difficulties would be multiplied many times, or it would even be impossible to obtain grids having these very fine lines with the present techniques.

The primary object of the present invention is to provide a new method of making these line screens, or grids, by the use of which screens having lines as fine as .0005" in width can be easily and accurately produced by unskilled personnel.

Another object is to provide a method of making these line screens which involves use of X-ray photography.

A further object is to provide a method of making these line screens, or grids, which comprises stacking in alternate face-to-face relation a plurality of strips, or sheets, of material which are equal in thickness to the opaque and transparent lines desired on the screen; the material having the thickness of the transparent lines being transparent to radiations to which a photographic film used is sensitive, while the material having the thickness of the opaque lines is opaque to these radiations. A photographic film, sensitive to the radiations in question, is then exposed edgewise through said stack by such radiations to make a negative photographic record representing the line screen and this negative is then processed to a positive photographic record which is used as the screen itself.

Another object is to provide a method of making line screens, as above set forth, wherein the radiations used for making the exposure are X-rays and the strips used in the stack are alternately lead, and any other metal or other rigid material which is transparent to X-rays.

The novel features that I consider characteristic of my invention are set forth with particularity in the appended claims. The invention itself, however, both as to its organization and the steps involved in carrying it out, together with additional objects and advantages thereof, will best be understood from the following description when read in connection with the accompanying drawings, in which:

Fig. 2 illustrates on an enlarged scale what the developed photographic negative of the screen might look like.

Like reference characters refer to corresponding parts throughout the drawing.

Figure 1:
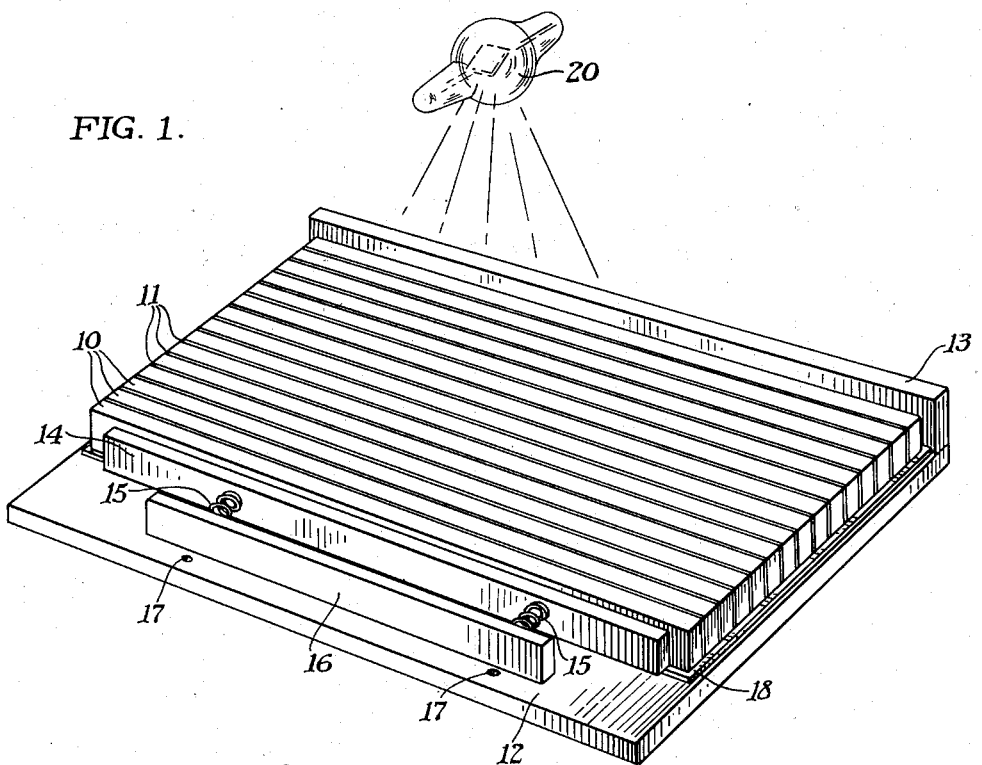
Fig. 1 is a diagrammatic view showing the arrangement of parts necessary for making a photographic exposure which is one step in the present method of producing line screens, or grids.
Figure 3:
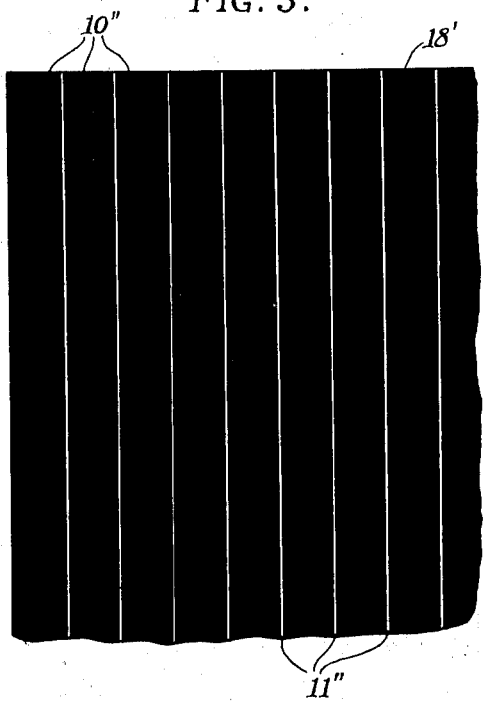
Fig. 3 illustrates on an enlarged scale what a photographic positive of the negative shown in Fig. 2 would look like and which positive is, in reality, the line screen it was desired to reproduce.

The line screen, or grid, which the present invention is to produce, will comprise a support bearing a plurality of alternate opaque and transparent lines and may appear as the screen shown in Fig. 3, while the relative widths of the transparent and opaque lines of the screen may be any ratio from 1:1 to 29:1, or more, depending upon how many different composite pictures are to be made on a single frame of film thereby, and/or viewed by the use thereof. The present invention is primarily concerned with, and useful in, the manufacture of screens having the higher ratio of line widths, and in which the transparent lines may be in the order of .001" or .0005" in width.

Let us assume that it is desired to make a line screen for exposing twenty-nine different composite pictures on a 4" x 5" single print; the transparent lines being .001" wide and spaced apart by opaque lines .029" wide, as set forth in the above-noted copending application of which I am coinventor. The first step in the procedure would be to select a plurality of strips, or sheets, of lead 4" long and .029" thick, and a plurality of similarly dimensioned strips of an X-ray transparent material but .001" thick. There are any number of X-ray transparent materials, such as steel, copper, etc., which can be readily obtained in gauges of .001" and even .0005", and in which these gauges are held to very close tolerances.

These lead and X-ray transparent material strips, indicated as 10 and 11 respectively in Fig. 11, are then stacked in alternate face-to-face relation until enough of them are stacked to give the other or 5" dimension desired in the screen. This stack of strips 10 and 11 is then placed on a flat support 12 and clamped between a fixed guide 13 and a movable jaw 14 acted on by springs 15 compressed between itself and another fixed guide 16 which is adjustably mounted on the top of the support by pins on the lower edge thereof, not shown, which are adapted to be inserted into pairs of holes 17 at the top of the support. The jaw 14 should preferably be of such dimension as to apply a uniform pressure over the entire face of the stack, so that the thin X-ray transparent sheets 11 will be held flat and straight between the lead strips 10.

Figure 2:
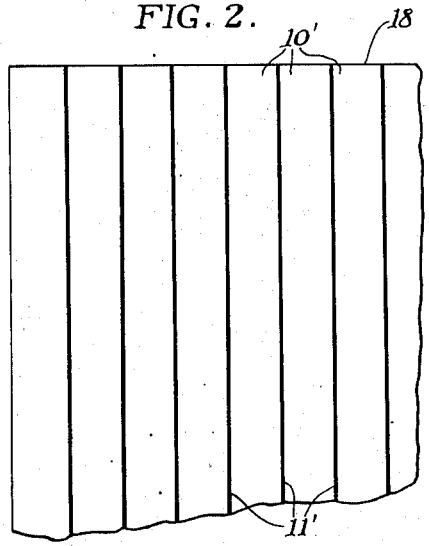

A sheet of film or a plate 18 having a high contrast X-ray sensitive emulsion is disposed on the support 12 beneath, and preferably in direct contact with the stack of strips 10 and 11 and is uniformly exposed in any suitable manner edgewise through the stack by a source of X-ray radiation, as indicated at 20. The exposed X-ray film is then developed to a photographic negative by the usual process, and the negative will show the lines in a reversed relation to that desired, or with the wide lines transparent and the thin lines opaque, as indicated in Fig. 2 wherein the lines corresponding to strips 10 and 11 are indicated by the same numerals primed. Now, if a contact print is made of this negative on an ordinary photographic film, or plate, having a light-sensitive silver halide emulsion, a positive photographic record 18' will be obtained having the wide lines opaque and the thin lines transparent, as shown in Fig. 3, wherein the lines are noted as 10" and 11" to refer to their counterparts in the negative and in the stack of metal strips. This positive photographic record 18' will then constitute the desired line screen. Since these line screens must possess sufficient dimensional stability to allow them to be moved as a unit by suitable indexing mechanism, and to insure the opaque and transparent lines retaining their desired relative positions and dimensions throughout their length, photographic plates are recommended for making the final positive record which is to serve as the line screen, rather than using films having flexible supports.

While the preferable technique involves developing the exposed X-ray film to a negative and then making a contact print therefrom to obtain the positive record, which is the line screen desired, it is possible to eliminate the step of making the contact print by obtaining the desired positive from the X-ray negative directly through reversal processing of the negative in the customary and well-known manner of reversal processing. In general, this reversal processing technique involves treating the negative with a solution which will wash or dissolve out the silver deposits of the negative and leave the silver bromide deposits unaffected. This technique would necessitate a relatively long exposure to the X-ray radiations in order to be sure that the silver was affected to the full depth of the emulsion; it being remembered that the concentration of silver in an X-ray emulsion is much greater than in an ordinary, light-sensitive silver halide emulsion. This would be no limitation, however, in this particular application of X-rays, since the subject is still, and is one which would not be affected by X-ray radiation as is the human body where time of exposure is an important factor.

One advantage of developing the X-ray exposed film to a negative photographic record and then making contact prints therefrom onto photographic plates having the customary light-sensitive emulsion is that once the master negative is made, then any number of contact prints can be readily made therefrom to be used as line screens. It will also be appreciated that this photographic method of making line screens is not limited to making screens having only very thin transparent lines; i. e., .001"–.0005" wide, but could also be used to advantage in making line screens having relatively wide transparent lines. The advantage in this later instance would reside in the fact that the photographic technique disclosed eliminates the use of mechanical tools which have to be kept in proper condition and involve the relative movement of parts which bring the problem of wear into consideration and which depend upon the personal factor for their operation.

Theoretically, this method of making line screens or grids is not limited to the use of X-ray radiations and strips 10 and 11 made of materials consistent with the use of X-ray radiation, although its primary advantage over known techniques resides in these features. This method could be practised by using visible light and ordinary light-sensitive film for making the exposure, and in which case the strips 10 would be opaque to visible light, and the strips 11 could be made of a transparent material. The main disadvantage to this procedure arises in the production of very fine line screens because it is not only difficult to obtain a transparent sheeting material in gauges as thin as .001" and .0005", but if such gauges of this material are obtainable, their thickness is not too uniform. Furthermore, transparent sheeting of this gauge could not be as rigid as a metal sheet of the same gauge, but would be likely to be compressed by different amounts at different points along its length when put in the stack under pressure.

While for purposes of illustration in the drawings I have shown the lines of the screen as being parallel and vertical, it is pointed out that the present method could be used to produce screens having the lines running horizontal, at an angle, or having any relative disposition suitable for use in the production of composite pictures of the type with which such screens are used.

Although I have shown and described certain specific embodiments of my invention, I am fully aware that many modifications thereof are possible. My invention, therefore, is not to be limited to the particular details of construction shown and described, but is intended to include all modifications coming within the scope of the appended claims.

Having thus described my invention, what I claim is new and desire to secure by Letters Patent of the United States is:

1. The method of making a line screen consisting of a transparent support bearing alternate transparent lines separated by opaque lines and comprising the steps of alternately stacking in parallel face-to-face relation strips of X-ray transparent material equal in thickness to the transparent lines required with strips of X-ray opaque material equal in thickness to the opaque lines required, and making a photographic record representative of the line screen to be produced by X-ray exposure of an X-ray sensitive emulsion edgewise through said stack of strips and development of said exposed emulsion.

2. The method of making a fine line screen consisting of a support bearing thin transparent lines separated by opaque lines of greater width and comprising the steps of alternately stacking in parallel face-to-face relation strips of X-ray transparent material equal in thickness to the transparent lines required with strips of X-ray opaque material equal in thickness to the opaque lines required, exposing a transparent support having an X-ray sensitive emulsion thereon edgewise through said stack of strips to a radiation of X-rays, and processing said exposed support to a photographic record consisting of thin transparent lines separated by wider opaque lines of the size and arrangement desired in the lined screen.

3. The method of making a fine line screen consisting of a support bearing thin transparent lines separated by opaque lines of greater width, and comprising the steps of alternately stacking in parallel face-to-face relation very thin strips of X-ray transparent material and wider strips of X-ray opaque material exposing a support having an X-ray sensitive emulsion thereon through said stack of strips edgewise to a radiation of X-rays, developing said exposed support to a negative, and making a contact print from said negative to produce the desired screen bearing thin transparent lines separated by wider opaque lines.

4. The method of making a fine line screen consisting of a transparent support bearing thin parallel transparent lines separated by opaque lines of greater width and comprising the steps of alternately stacking in parallel face-to-face relation sheets of X-ray transparent material equal in thickness to the width of transparent lines required with sheets of lead equal in thickness to the opaque lines required, clamping said stack of sheets together with uniform pressure distributed substantially over the entire area of the top and bottom of the stack, placing an X-ray film against one side of the stack, exposing said film to radiation of X-rays edgewise through said stack, developing said X-ray film to a negative photographic record, and making a positive photographic record from said negative record which constitutes said line screen.

5. The method of making a fine line screen consisting of a transparent support bearing thin parallel transparent lines separated by opaque lines of greater width and comprising the steps of alternately stacking in parallel face-to-face relation sheets of X-ray transparent material equal in thickness to the width of transparent lines required with sheets of lead equal in thickness to the opaque lines required, clamping said stack of sheets together with uniform pressure distributed substantially over the entire area of the top and bottom of the stack, placing an X-ray film against one side of the stack, exposing said film to radiations of X-rays edgewise through said stack, developing said X-ray film to a negative photographic record, making a contact print from said negative onto a glass plate having a light-sensitive emulsion thereon, and developing said glass plate to produce a positive photographic record which constitutes the desired line screen.

6. The method of making a line screen of the type described comprising alternately stacking in parallel face-to-face relation strips of material transparent to radiant energy over a given range of the spectrum and strips of material opaque to said range of radiant energy, exposing a photographic plate having an emulsion sensitive to said range of radiant energy edgewise through said stack of strips to radiation of energy in said range, and processing said exposed plate to a photographic record consisting of alternate transparent and opaque lines on a transparent support and constituting said line screen.

FORDYCE E. TUTTLE.

REFERENCES CITED

The following references are of record in the file of this patent:

UNITED STATES PATENTS

| Number | Name | Date |
|---|---|---|
| 2,115,755 | Wantz et al. | May 3, 1938 |
| 2,178,798 | Lindstedt et al. | Nov. 7, 1939 |
| 2,468,963 | Dudley | May 3, 1949 |